United States Patent [19]
O'Brien et al.

[11] Patent Number: 5,816,394
[45] Date of Patent: Oct. 6, 1998

[54] ECOLOGICALLY ACCEPTABLE PACKAGE FOR A RECORDING MEDIUM

[75] Inventors: Patrick J. O'Brien, Maywood, N.J.; Arthur Kern, Rye, N.Y.

[73] Assignee: Ivy Hill Corporation, New York, N.Y.

[21] Appl. No.: 898,807

[22] Filed: Jul. 23, 1997

[51] Int. Cl.⁶ .................................................. B65D 85/57
[52] U.S. Cl. ...................... 206/308.1; 206/309; 206/310; 206/312
[58] Field of Search ................................ 206/308.1, 309, 206/310, 312, 313, 307, 493

[56] References Cited

U.S. PATENT DOCUMENTS

| | | | |
|---|---|---|---|
| 4,176,744 | 12/1979 | Borzak | 206/310 X |
| 4,709,812 | 12/1987 | Kosterka | 206/310 |
| 5,188,230 | 2/1993 | O'Brien et al. | |
| 5,366,074 | 11/1994 | O'Brien et al. | |
| 5,372,253 | 12/1994 | O'Brien et al. | |
| 5,419,433 | 5/1995 | Harrer et al. | 206/313 |
| 5,421,453 | 6/1995 | Harrer et al. | 206/312 |
| 5,529,182 | 6/1996 | Anderson et al. | 206/308.1 |
| 5,593,030 | 1/1997 | Tell | 206/308.1 |
| 5,600,628 | 2/1997 | Spector | 206/308.1 X |
| 5,611,426 | 3/1997 | Warfield | 206/308.1 |

*Primary Examiner*—Bryon P. Gehman
*Attorney, Agent, or Firm*—Amster, Rothstein & Ebenstein

[57] ABSTRACT

An ecologically acceptable package for a recording medium includes a pair of easily separable paperboard and plastic components. The paperboard component defines a hollow box with a front face defining a large central aperture, and a front flap pivotal between a closed orientation wherein the front flap overlies the box front face to block access thereto and an open orientation wherein the front flap exposes the box front face to enable access thereto. The plastic component is thermoformed and defines a tray and optionally a locking mechanism. The tray includes a downwardly extending recess disposed at least partially within the front face central aperture for receipt of a recording medium, and an outwardly extending margin. The tray also includes a plurality of depressions about the recess for releasably securing the plastic component to the box front face without the use of glue. The optional locking mechanism includes an extension extending outwardly from the tray margin to a box edge, and a flipper connected to the extension by a living hinge and pivotable between a blocking orientation wherein the flipper blocks movement of the front flap between the open and closed orientations and an enabling orientation wherein the flipper enables such movement of the front flap.

21 Claims, 6 Drawing Sheets

ECOLOGICALLY ACCEPTABLE PACKAGE FOR A RECORDING MEDIUM

BACKGROUND OF THE INVENTION

The present invention relates to an ecologically acceptable package for a recording medium and, more particularly, to such a package comprising a pair of easily separable paperboard and plastic components.

The well known and conventional "jewel box" package for a digital recording medium such as a compact disc (whether it be a sound CD, a CD-ROM, or a DVD) and like packages for a digital recording medium have come under fire for ecological reasons. The "jewel box" uses a substantial amount of plastic and, indeed, is entirely plastic except for the printed matter which may be inserted into the package for identification and advertising purposes. The plastic utilized in the "jewel box" package is especially objectionable since it must be relatively thick in order to provide rigidity to the package and thereby enhance protection to the recording medium within.

In an effort to provide such packages which utilize less plastic, hybrid packages comprising both paperboard and plastic components have been developed. However, these hybrid packages have not proven to be entirely satisfactory. In certain areas of the world, it is actually the law that a product must be easily separable into its recyclable components. Thus, a product containing both paperboard and plastic components must have these components easily separable so as to promote the separate disposition of the paperboard components and the plastic components.

In fact, the paperboard and plastic components of the hybrid packages are not as easily separable as might be desired, especially by those who have only limited use of their fingers as a result of age or infirmity. Further, since these hybrid structures also depend upon the plastic component to provide rigidity to the package, the plastic component is necessarily relatively thick in order to provide the desired rigidity and hence requires a substantial quantity of plastic.

Accordingly, it is an object of the present invention to provide an ecologically acceptable package for a recording medium comprising a pair of easily separable paperboard and plastic components.

Another object is to provide such a package in which the various components are easily separable even by those with limited use of their fingers.

A further object is to provide such a package which utilizes a minimum amount of the plastic component and does not rely upon the plastic component to provide rigidity to the package.

It is another object of the present invention to provide such a package wherein the plastic component is thermoformed.

It is a further object to provide such a package which is easy and economical to manufacture and use.

SUMMARY OF THE INVENTION

It has now been found that the above and related objects of the present invention are obtained in an ecologically acceptable package for a recording medium comprising a pair of easily separable paperboard and plastic components. The paperboard component defines a hollow box, with a front face defining a large central aperture and a pair of edges, and a front flap extending from a first one of the box edges for the pivotal movement. The front flap is pivotable between a closed orientation wherein the front flap overlies the box front face to block access thereto and an open orientation wherein the front flap exposes the box front face to enable access thereto.

The plastic component is thermoformed and defines a tray and an optional locking mechanism. The tray includes a downwardly extending recess disposed at least partially within the front face central aperture for receipt of a recording medium, and an outwardly extending margin disposed at least partially about the recess and on the box front face. The tray additionally includes opposed finger wells communicating with the recess to facilitate removal of a recording medium from the recess, a plurality of depression means about the recess for releasably securing the plastic component to the box front face without the use of glue, and a rosette centrally disposed in the recess for releasably maintaining a recording medium in the recess.

The optional locking mechanism includes an extension extending outwardly from the tray margin to a second one of the box edges, and a flipper connected to the extension by a living hinge. The flipper is pivotable between a blocking orientation wherein the flipper blocks movement of the front flap between the open and closed orientations and an enabling orientation wherein the flipper enables movement of the front flap between the open and closed orientations.

In a preferred embodiment, the box front face and the front flap in the closed orientation together define a pair of vertically aligned, relatively small apertures therethrough adjacent a second one of the box edges, the flipper defines a downwardly extending projection, and the extension defines a downwardly extending groove. In the closed and blocking orientations, the flipper projection extends through the front flap relatively small aperture and is snugly but releasably received by the extension groove, with both the flipper projection and the extension groove extending into the relatively small front face aperture and below the box front face. Preferably the extension groove is undercut at the ends thereof for releasably securing the plastic component to the box front face without the use of glue. Preferably the finger wells and depression means of the tray are also undercut for releasably securing the plastic component to the box front face without the use of glue.

The plastic component is substantially flexible. Preferably the recess defines a flexible bottom sloping radially outwardly and downwardly to enable downward travel of the rosette as a recording medium is inserted thereon without damage to the recording medium. In the closed and blocking orientations, the flipper engages only the extension of the plastic component and is connected to the extension only by the living hinge and the engagement between the flipper projection and the extension groove.

The present invention also encompasses the plastic component by itself, either with or without the optional locking mechanism.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing, wherein.

DETAILED DESCRIPTION OF THE PREFERRED EMBODIMENTS

Figure 3:
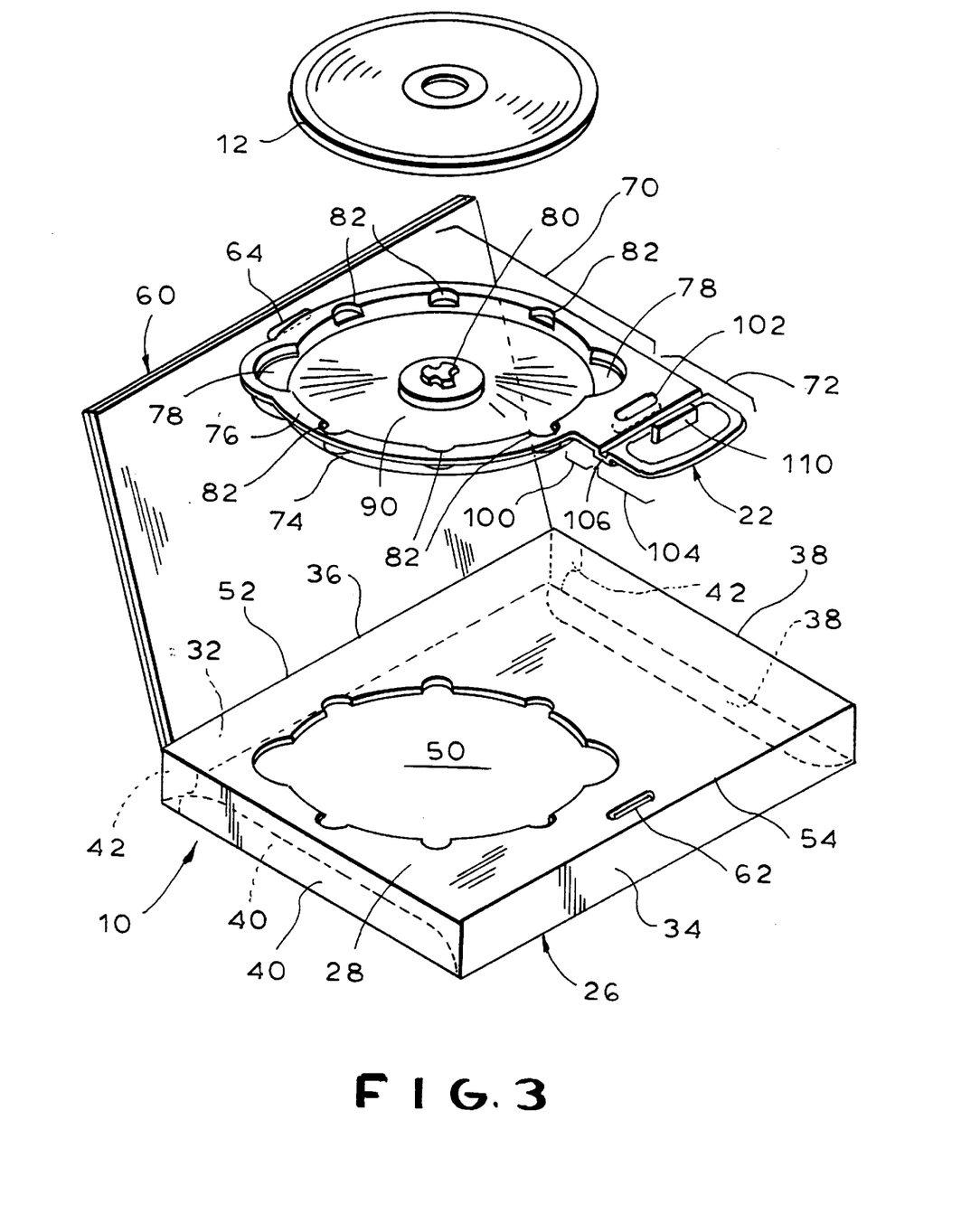
FIG. 3 is a exploded isometric view of the package according to the present invention, with a compact disc ready for insertion thereto.
Figure 4:
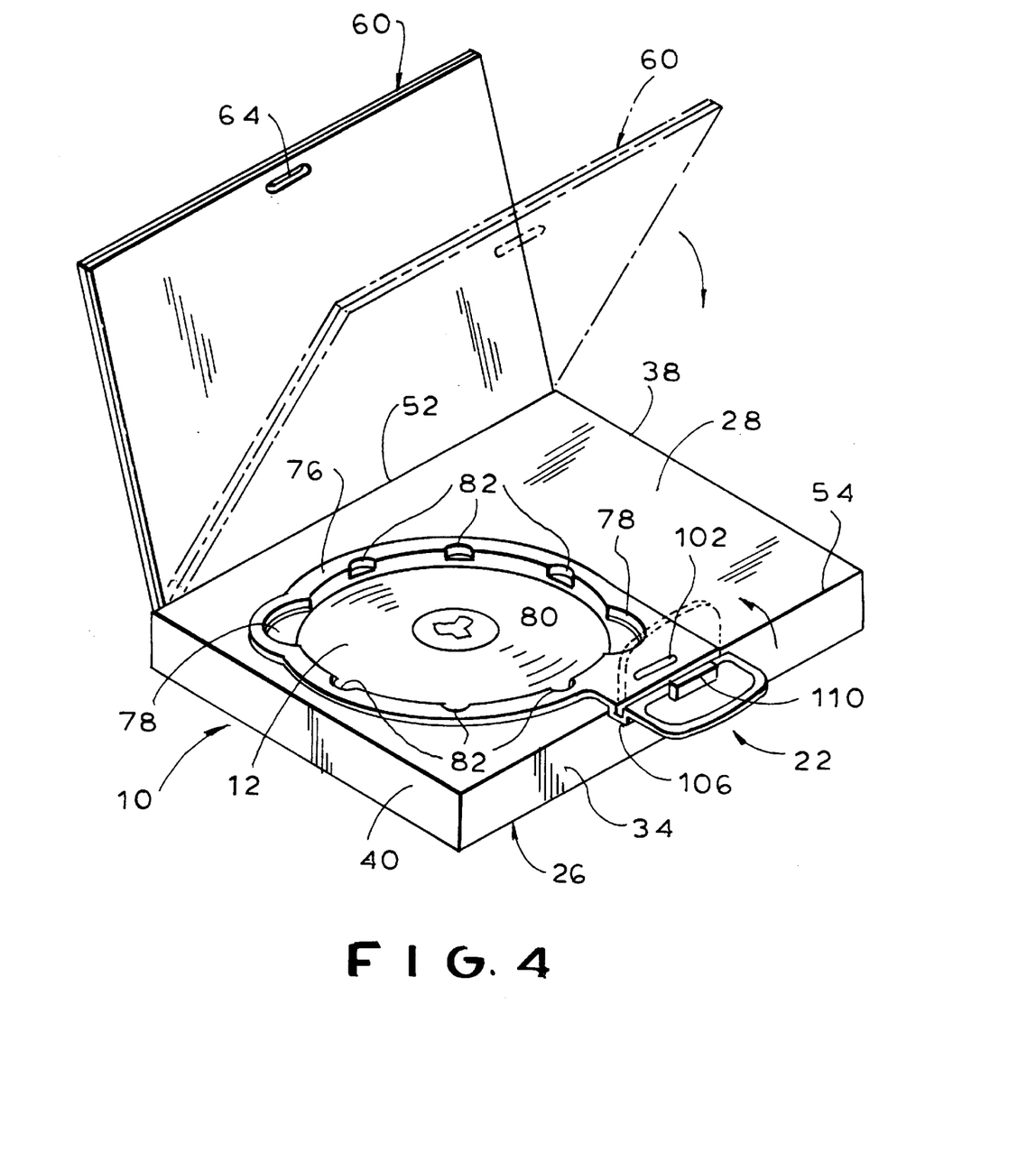
FIG. 4 is a isometric view of the package according to the present invention with the front flap in the open orientation (and in an intermediate orientation in phantom line) and the flipper in the enabling orientation (and in an intermediate orientation in phantom line)
Figure 5:
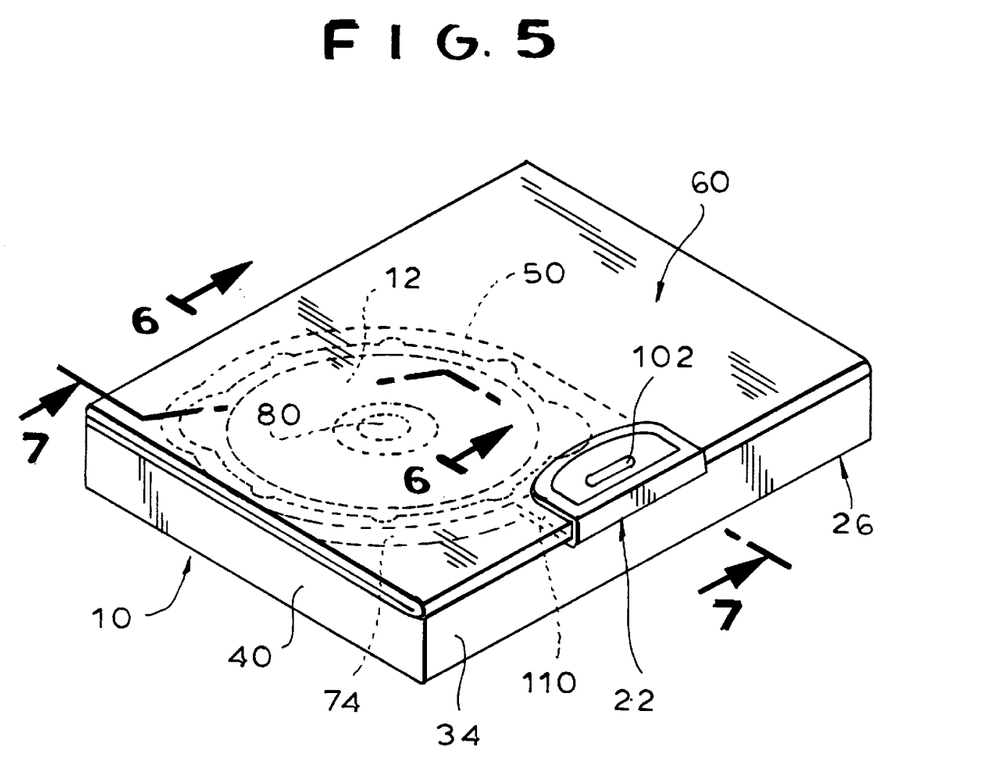
FIG. 5 is a isometric view of the package with the front flap in the closed orientation and the flipper in the blocking orientation.

Referring now to the drawing, and in particular to FIGS. 4 and 5 thereof, therein illustrated is an ecologically acceptable package for a recording medium according to the present invention, generally designated by the reference numeral 10. The recording medium 12 (see FIG. 4) is illustrated as a circular compact disc —whether it be a standard audio CD, a CD-ROM, a DVD, or a like digital recording medium. It will be appreciated, however, that like digital recording media, may come in inner packaging which is rectangular. The package 10 comprises a pair of easily separable components: a paperboard component generally designated 20 and a plastic component generally designated 22. These components and the disc 12 are illustrated separately in FIG. 3.

Figure 1A:
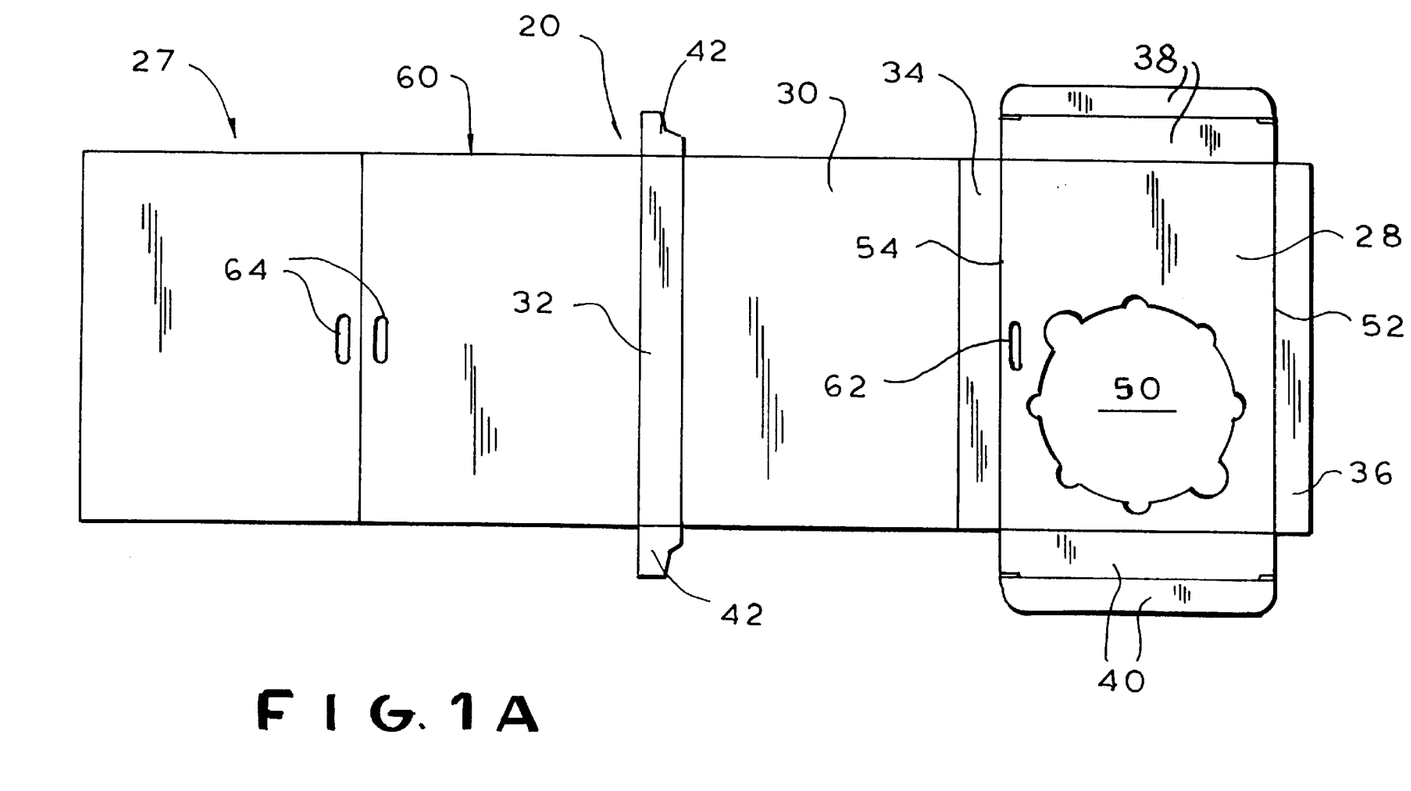
FIG. 1A is a top plan view of a blank for the paperboard component of the present invention.

Referring now to FIG. 3, the paperboard component 20 defines a hollow box, generally designated 26. The box 26 is preferably constructed from a die-cut and scored blank 27 (illustrated in FIG. 1A in an unfolded orientation) including a front face panel 28, a back face panel 30, a pair of side panels 32, 34, a glue flap 36 extending from the free end of the front face 28, and top and bottom folded tuck flaps 38, 40 and lock tabs 42 for engaging the ends of the folded tuck flaps 38, 40. When the blank is appropriately folded and the glue flap 36 glued to the inner surface of the side panel 32, an open-ended hollow box (not shown) is formed. At this point, the upper and lower folded tuck flaps 38, 40 are folded down to close the open ends and engage the tabs 42, thereby closing the ends of the hollow box. The box 26 thus formed (see FIG. 3) is a relatively rigid parallelepiped which will provide rigidity to the package 10.

For reasons which will become apparent hereinafter, the hollow box 26 defines a large central aperture 50 typically disposed substantially in either the top half or, as illustrated, the bottom half of the front face 28. The box 26 also defines a pair of edges 52, 54, the edges contacting opposing sides of the box front face 28, the edge 52 also being in contact with the side 32 (adjacent glue flap 36) and the edge 54 also being in contact with the side 34.

The paperboard component 20 additionally includes a front flap 60 extending from the box edge 52 for pivotal movement between a closed orientation (as illustrated in FIG. 5) wherein the front flap 60 overlies the box front face 28 to block access thereto (and in particular to the area of the large central aperture 50 thereof) and an open orientation (as illustrated in FIG. 4) wherein the front flap 60 exposes the box front face 28 to enable access thereto (and in particular to the area of the large central aperture 50 thereof). The front flap 60 is illustrated in FIG. 4 in phantom line in an intermediate orientation (between the open and closed orientations), with the associated arrow indicating the direction of movement towards the closed orientation.

Preferably, the front flap 60 is formed from a single panel extending from the box edge 52 and bent over inwardly, with the two half-panels being glued together to form an easily handleable, double-thickness, relatively rigid cover flap. It will be appreciated by those skilled in the packaging art that the construction described above enables the use of paperboard which has been coated on only one side thereof to form a paperboard component 20 wherein all of the visible or exposed surfaces of the box 26 and the front flap 60 are coated and thus amenable to multicolor printing. (This excludes only the portion of the box interior which may be viewed through the large central aperture 50, but this is of no concern, as the large central aperture 50 will later be closed by the plastic component 22.)

For reasons which will become apparent hereinafter, the box front face 28 and the front flap 60 in the closed orientation together define a pair of vertically aligned, relatively small apertures 62 and 64, respectively. The small apertures 62, 64 are disposed adjacent the box edge 54. Accordingly, the small aperture 64 through the front flap 60 (both half panels thereof) lies adjacent the free end of the front flap 60 just as the small aperture 62 is disposed between the large central aperture 50 of the box front face 28 and the box edge 54.

Figures 1B, 2:
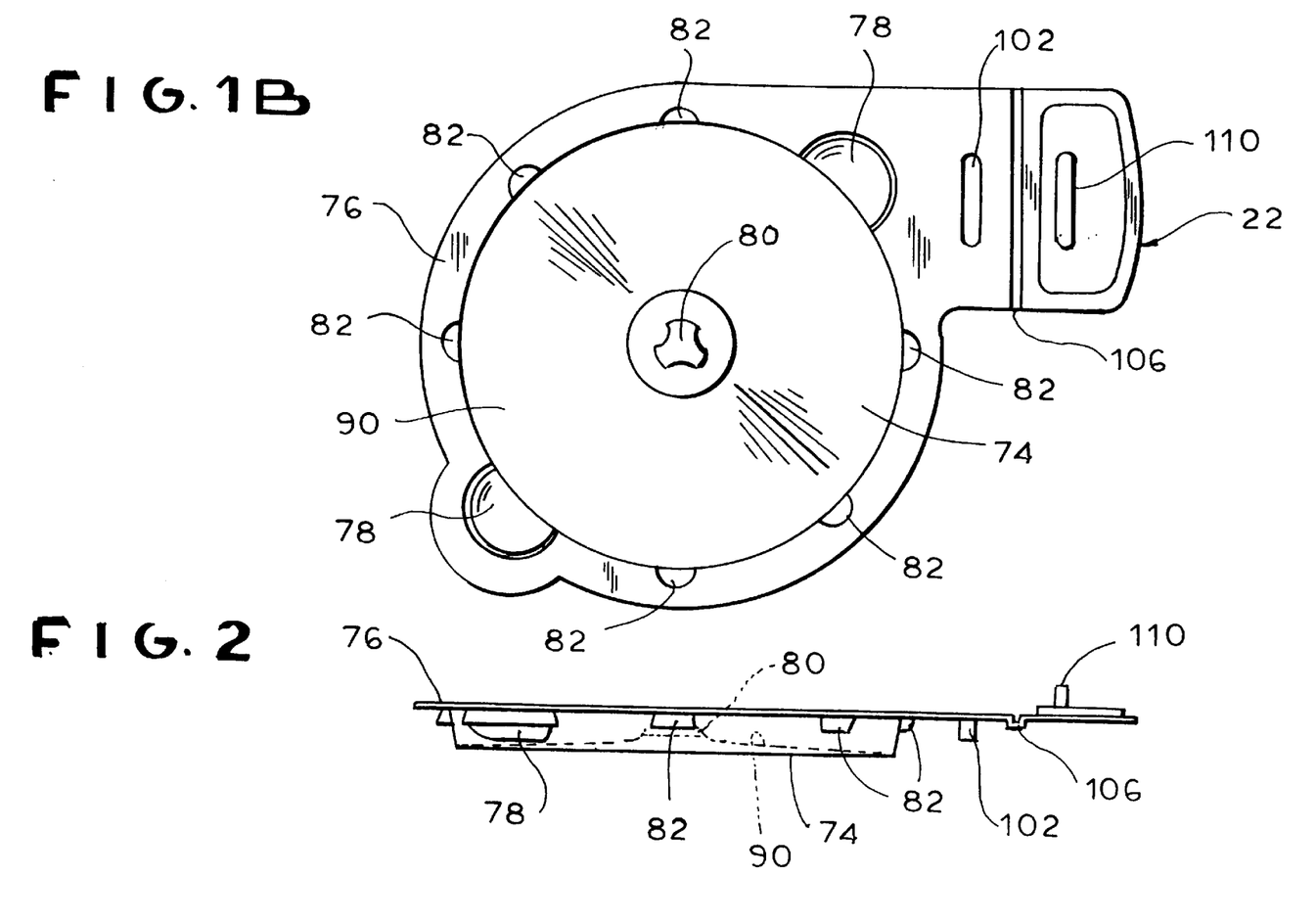
FIG. 1B is a top plan view of the plastic component of the present invention.
FIG. 2 is a side elevational view of the plastic component.

Referring now to FIGS. 1B and 2, the plastic component 22 is thermoformed and defines a tray, generally designated 70, and an optional locking mechanism, generally designated 72. As will be appreciated by those in the plastic-molding arts, the thermoforming of the plastic component involves both the application of a vacuum and heat (as opposed to vacuum-forming, which involves the application of a vacuum without heat). The thickness of the thermoformed plastic component 22 is typically only about 0.5–1.0 mm so that the product is substantially flexible, albeit typically resilient (such that it seeks to return to its original configuration).

The tray 70 includes a downwardly extending recess 74 disposed at least partially within the front face central aperture 50 for receipt of a recording medium 12, as best seen in FIG. 4. An outwardly extending tray margin 76 is disposed at least partially about the recess 74 and on the box front face 28. The outward extending tray margin 76 prevents the recess 74 from falling through the front face central aperture 50.

The tray 70 additionally includes at least one pair of opposed finger wells 78 which communicate with the bottom of the recess 74 to facilitate a user removing a recording medium 12 from the recess 74. A rosette 80 is centrally disposed in the recess 74 for releasably retaining a recording medium 12 in the recess 74. Recesses 74, finger wells 78 and rosettes 80 are well known in the packaging art and need not be described herein in further detail.

Figure 7:
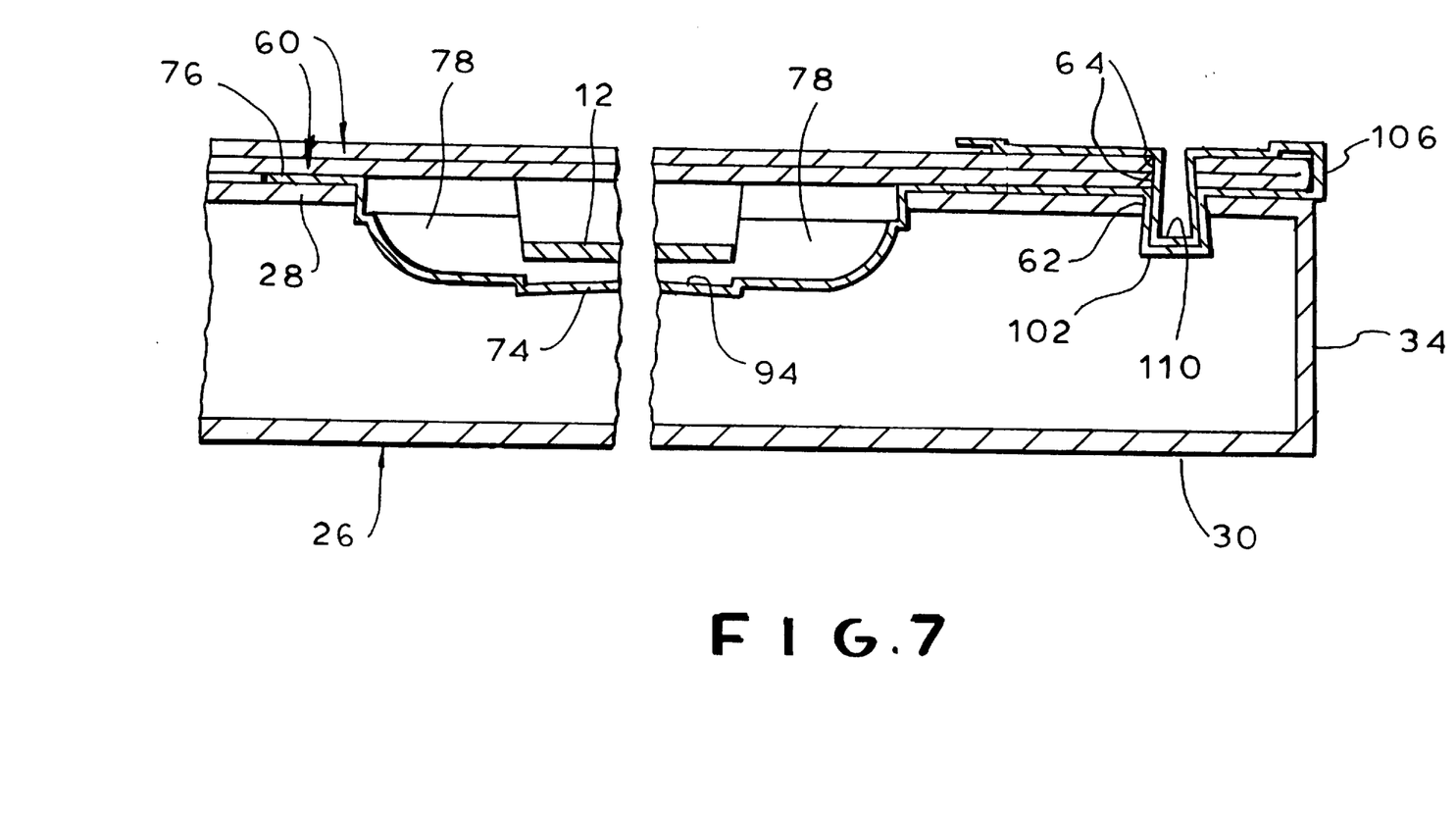

The tray 70 additionally includes a plurality of depressions 82 spaced about the circumference of the recess 74 (six depressions being illustrated) for releasably securing the plastic component 22 (at least the tray 70 thereof) to the box front face 28 without the use of glue. Each depression 82 is undercut such that the insertion of the tray 70 into the front face central aperture 50 causes a momentary displacement of the box front face 28 in the area about the depressions 82, thereby to permit passage of the bottom portion of the depression 82 thereby, and then a swift return of the front face 28 to its original position, so that the box front face 28 now retains the outward sloping wall of the depression 82 below the box front face 28. If desired, as illustrated in FIG. 7, the finger wells 78 of the tray 70 may also be undercut, again for releasably securing the plastic component 22 to the box front face 28 without the use of glue.

The height of the box 26 is at least as high as the depth of the recess 74 so that the box 24 can accommodate the recess 74 when the tray margin 76 is resting on the box front face 28. If at least one of the folded tuck flaps 38, 40 will be releasable from its folded-under position in the box 26, the height of the box 26 preferably exceeds the height of the recess 74 so that printed matter (such as promotional materials, details of the performance or program on the recording medium 12, or the like) can be handily disposed within the box 26 for ready reference.

Figure 6:
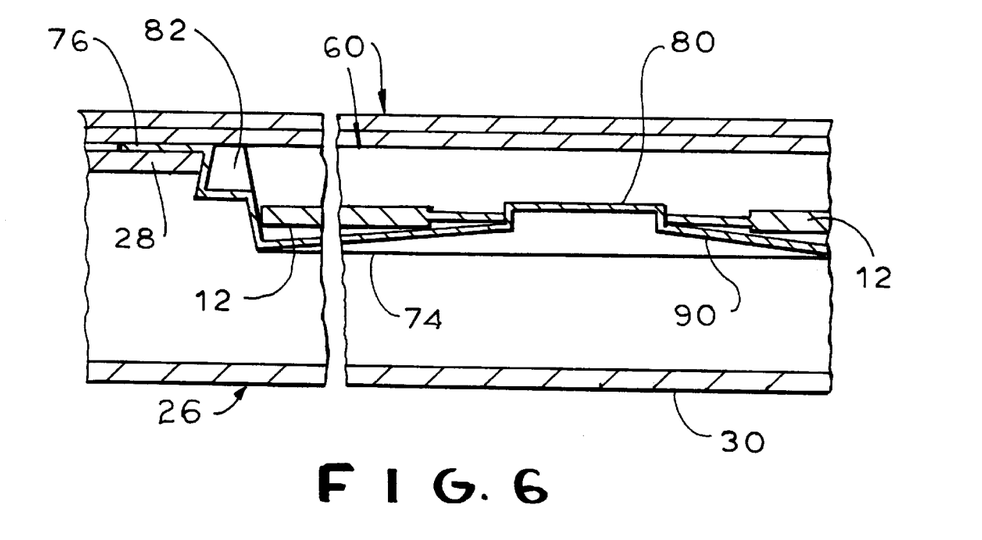
FIGS. 6 and 7 are sectional views taken along the lines of 6—6 and 7—7 of FIG. 5.

Because the tray 70 is substantially flexible, it is to be expected that the downward pressure applied by the user during insertion of a recording medium 12 onto the rosette 80 and into the recess 74 will to some degree downwardly deflect the rosette 80. If the rosette 80 is deflected downwardly, then the undersurface of the recording medium 12 may come into contact with the remainder of the bottom of the recess 74, with the potential of damage to the recording medium playing surface. Accordingly, in a preferred embodiment of the present invention, as best seen in FIG. 6, the recess 74 defines a flexible bottom 90 sloping radially outwardly and downwardly to enable downward travel of the rosette 80 as a recording medium 12 is inserted thereon, without damage to the playing surface of the recording medium 12. The radially outwardly and downwardly sloping flexible bottom 90 of the recess 74 not only enables downward travel of the rosette 80 as a recording medium is inserted thereon without damage to the recording medium as indicated by the arrows, but to some degree resists such downward travel of the rosette 80.

As already noted, optionally the plastic component 22 additionally includes a locking mechanism 72. The locking mechanism includes an extension, generally designated 100, of a portion of the tray margin 76 which extends outwardly to the box edge 54.

For reasons which will become apparent hereinafter, the extension 100 defines a downwardly extending groove 102. The extension groove 102 is disposed within the small aperture 62 of the box front face 28. Preferably, the longitudinally extending extension groove 102 is also undercut at the ends thereof for releasably securing the plastic component 22 (and in particular the extension 100 thereof) to the box front face 28 without the use of glue.

The locking mechanism 72 additionally includes a flipper, generally designated 104, connected to the extension 100 by a living hinge 106. The living hinge 106 enables the flipper 104 to be pivotable between a blocking orientation (as illustrated in FIG. 5), wherein the flipper 104 blocks movement of the front flap 60 between the open and closed orientations, and an enabling orientation (as illustrated in FIG. 1B–4), wherein the flipper 104 enables movement of the front flap 60 between the open and closed orientations. More particularly, when the flipper 104 is in the blocking orientation, it maintains the front flap 60 in the closed orientation. The flipper 104 is illustrated in phantom line in FIG. 4 in an intermediate orientation, the associated arrow illustrating the direction of movement towards the blocking orientation. For reasons which will become apparent hereinafter, the flipper 104 defines a downwardly extending projection 110 which is configured and dimensioned to be snugly received within the downwardly extending groove 102 of the extension 100.

The locking function to be described now links together the small aperture 62 of the box front face 28, the small aperture 64 of the front flap 60, the groove 102 of extension 100 and the projection 110 of the flipper 104. In the closed and blocking orientations, the flipper projection 110 extends downwardly through the relatively small aperture 64 of the front flap 60 and is snugly but releasably received by the groove 102 of the extension 100. Both the flipper projection 110 and the extension groove 102 extend into the relatively small front face aperture 62 and below the box front face 28. Thus, the extension groove 102 is maintained within the box front face small aperture 62, and the flipper projection 110 extends through the front flap small aperture 64 and into the extension groove 102 to maintain the front flap 60 in the closed orientation. This prevents accidental loss of the recording medium 12 from the recess 74 because the open top of the recess 74 is closed by the front flap 60 in the closed orientation. On the other hand, in order to remove the recording medium 12, one has only to lift the flipper 110 to separate the flipper projection 104 from the extension groove 102 and the front flap small aperture 64, thereby to enable the front flap 60 to be pivoted to an open orientation enabling removal of the recording medium 12 from the recess 74.

In the closed and blocking orientations, the flipper 104 is connected to the extension 100 only by the living hinge 106 and the engagement between the flipper projection 110 and the extension groove 102. In other words, the flipper 104 engages only the extension 100 of the plastic component 22 (although it also passes through the front flap small aperture 64).

To summarize, the present invention provides an ecologically acceptable package for a recording medium comprising a pair of easily separable paperboard and plastic components. The components are easily separable even by those with limited use of their fingers. Furthermore, the package utilizes a minimum amount of the plastic component as it does not rely upon the plastic component to provide rigidity to the package. The plastic component is thermoformed so that the entire package is easy and economical to manufacture and use.

When the time comes to discard the package 10, the free end of the flipper 104 may be grasped and pulled upwardly as the box 26 is held by the other hand. As a result, the plastic component 22 will separate from the paperboard component 20 as the force exerted by the separator exceeds the force required to deflect the paperboard component about the undercuts of the plastic component. The paperboard and plastic components are then available for separate recycling.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

I claim:

1. An ecologically acceptable package for a recording medium, comprising a pair of easily separable paperboard and plastic components as follows:

(A) a paperboard component defining:
  (i) a hollow box with a front face defining a large central aperture and a pair of edges; and
  (ii) a front flap extending from a first one of said box edges for pivotal movement between a closed orientation wherein said front flap overlies said box front face to block access thereto and an open orientation wherein said front flap exposes said box front face to enable access thereto; and (B) a thermoformed plastic component defining a tray, said tray including:

(i) a downwardly extending recess disposed at least partially within said front face central aperture for receipt of a recording medium, and an outwardly extending margin disposed at least partially about said recess and on said box front face;

(ii) opposed finger wells communicating with said recess to facilitate removal of a recording medium from said recess;

(iii) a plurality of depression means about said recess for releasably securing said plastic component to said box front face without the use of glue by maintaining portions of said box front face intermediate said tray margin and said plurality of depression means of said tray; and (iv) a rosette centrally disposed in said recess for releasably maintaining a recording medium in said recess.

2. The package of claim 1 wherein said plastic component is substantially flexible.

3. The package of claim 2 wherein said recess defines a flexible bottom sloping radially outwardly and downwardly to enable downward travel of said rosette as a recording medium is inserted thereon without damage to the recording medium.

4. The package of claim 1 wherein said depression means of said tray are undercut for releasably securing said plastic component to said box front face without the use of glue.

5. The package of claim 1 wherein said finger wells of said tray are undercut for releasably securing said plastic component to said box front face without the use of glue.

6. An ecologically acceptable package for a recording medium, comprising a pair of easily separable paperboard and plastic components as follows:

(A) a paperboard component defining:

(i) a hollow box with a front face defining a large central aperture and a pair of edges; and (ii) a front flap extending from a first one of said box edges for pivotal movement between a closed orientation wherein said front flap overlies said box front face to block access thereto and an open orientation wherein said front flap exposes said box front face to enable access thereto; and (B) a thermoformed plastic component defining a tray, said tray including:

(i) a downwardly extending recess disposed at least partially within said front face central aperture for receipt of a recording medium, and an outwardly extending margin disposed at least partially about said recess and on said box front face;

(ii) opposed finger wells communicating with said recess to facilitate removal of a recording medium from said recess;

(iii) a plurality of depression means about said recess for releasably securing said plastic component to said box front face without the use of glue; and (iv) a rosette centrally disposed in said recess for releasably maintaining a recording medium in said recess;

said plastic component additionally defining a locking mechanism, said locking mechanism including:

(i) an extension extending outwardly from said margin to a second one of said box edges; and (ii) a flipper connected to said extension by a living hinge and pivotable between a blocking orientation wherein said flipper blocks movement of said front flap between said open and closed orientations and an enabling orientation wherein said flipper enables movement of said front flap between said open and closed orientations.

7. The package of claim 6 wherein said box front face and said front flap in said closed orientation together define a pair of vertically aligned, relatively small apertures therethrough adjacent a second one of said box edges, said flipper defines a downwardly extending projection, and said extension defines a downwardly extending groove; in said closed and blocking orientations, said flipper projection extending through said front flap relatively small aperture and being snugly but releasably received by said extension groove, with both said flipper projection and said extension groove extending into said relatively small front face aperture and below said box front face.

8. The package of claim 7 wherein said extension groove is undercut at the ends thereof for releasably securing said plastic component to said box front face without the use of glue.

9. The package of claim 7 wherein, in said closed and blocking orientations, said flipper is connected to said extension only by said living hinge and the engagement between said flipper projection and said extension groove.

10. The package of claim 9 wherein, in said closed and blocking orientations, said flipper engages only said extension of said plastic component.

11. The package of claim 6 wherein said box edges contact, and are spaced apart by the length of, said box front face.

12. An ecologically acceptable package for a recording medium, comprising a pair of easily separable paperboard and plastic components as follows:

(A) a paperboard component defining:

(i) a hollow box with a front face defining a large central aperture and a pair of opposing edges contacting said box front face; and (ii) a front flap secured to a first one of said box edges for pivotal movement between a closed orientation wherein said front flap overlies said box front face to block access thereto and an open orientation wherein said front flap exposes said box front face to enable access thereto;

said box front face and said front flap in said closed orientation together defining a pair of vertically aligned, relatively small apertures therethrough adjacent a second one of said box edges; and (B) a substantially flexible, thermoformed plastic component defining a tray and a locking mechanism;

said tray including:

(i) a downwardly extending recess disposed at least partially within said front face central aperture for receipt of a recording medium, and an outwardly extending margin disposed at least partially about said recess and on said box front face;

(ii) opposed finger wells communicating with said recess to facilitate removal of a recording medium from said recess;

(iii) a plurality of depression means about said recess for releasably securing said plastic component to said box front face without the use of glue; and (iv) a rosette centrally disposed in said recess for releasably maintaining a recording medium in said recess; and said locking mechanism including:
  (i) an extension extending outwardly from said recess to an upper surface of a second one of said box edges, and
  (ii) a flipper connected to said extension by a living hinge and pivotable between a blocking orientation wherein said flipper blocks movement of said front flap between said open and closed orientations and an enabling orientation wherein said flipper enables movement of said front flap between said open and closed orientations;

said flipper defining a downwardly extending projection, and said extension defining a downwardly extending groove; in said closed and blocking orientations, said flipper projection extending through said front flap relatively small aperture and being snugly but releasably received by said extension groove, with both said flipper projection and said extension groove extending into said relatively small front face aperture and below said box front face;

in said closed and blocking orientations, said flipper engaging only said extension of said plastic component and being connected to said extension only by said living hinge and the engagement between said flipper projection and said extension groove;

said finger wells, said depression means, and said extension groove being undercut for releasably securing said plastic component to said box front face without the use of glue;

said recess defining a flexible bottom sloping radially outwardly and downwardly to enable downward travel of said rosette as a recording medium is inserted thereon.

13. A plastic component for an ecologically acceptable package for a recording medium, the package comprising a pair of easily separable paperboard and plastic components as follows:
  (A) the paperboard component defining:
    (i) a hollow box with a front face defining a large central aperture and a pair of opposing edges contacting the box front face; and
    (ii) a front flap secured to a first one of the box edges for pivotal movement between a closed orientation wherein the front flap overlies the box front face to block access thereto and an open orientation wherein the front flap exposes the box front face to enable access thereto;
    the box front face and the front flap in the closed orientation together defining a pair of vertically aligned, relatively small apertures therethrough adjacent a second one of the box edges; and
  (B) said plastic component being substantially flexible and thermoformed and defining a tray, said tray including:
    (i) a downwardly extending recess configured and dimensioned to be disposed at least partially in an aperture within a front face of the paperboard component box for receipt of a recording medium, and an outwardly extending margin configured and dimensioned to be disposed at least partially about said recess and disposed on the box front face;
    (ii) opposed finger wells communicating with said recess to facilitate removal of a recording medium from said recess;
    (iii) a plurality of depression means about said recess configured and dimensioned for releasably securing said plastic component to the box front face without the use of glue by maintaining portions of said box front face intermediate said tray margin and said plurality of depression means of said tray; and
    (iv) a rosette centrally disposed in said recess for releasably maintaining a recording medium in said recess.

14. The plastic component of claim 13 wherein said recess defines a flexible bottom sloping radially outwardly and downwardly to enable downward travel of said rosette as a recording medium is inserted thereon without damage to the recording medium.

15. The plastic component of claim 13 wherein said depression means of said tray are undercut for releasably securing said plastic component to said box front face without the use of glue.

16. The plastic component of claim 13 wherein said finger wells of said tray are undercut for releasably securing said plastic component to said box front face without the use of glue.

17. A plastic component for an ecologically acceptable package for a recording medium, the package comprising a pair of easily separable paperboard and plastic components as follows:
  (A) the paperboard component defining:
    (i) a hollow box with a front face defining a large central aperture and a pair of opposing edges contacting the box front face; and
    (ii) a front flap secured to a first one of the box edges for pivotal movement between a closed orientation wherein the front flap overlies the box front face block access thereto and an open orientation wherein the front flap exposes the box front face to enable access thereto;
    the box front face and the front flap in the closed orientation together defining a pair of vertically aligned, relatively small apertures therethrough adjacent a second one of the box edges; and
  (B) said plastic component being substantially flexible and thermoformed and defining a tray, said tray including:
    (i) a downwardly extending recess configured and dimensioned to be disposed at least partially in an aperture within a front face of the paperboard component box for receipt of a recording medium, and an outwardly extending margin configured and dimensioned to be disposed at least partially about said recess and disposed on the box front face;
    (ii) opposed finger wells communicating with said recess to facilitate removal of a recording medium from said recess;
    (iii) a plurality of depression means about said recess configured and dimensioned for releasably securing said plastic component to the box front face without the use of glue; and
    (iv) a rosette centrally disposed in said recess for releasably maintaining a recording medium in said recess;
  said plastic component additionally defining a locking mechanism integral with said tray, said locking mechanism including:
    (i) an extension extending outwardly from said recess to an upper surface of a second one of the box edges; and
    (ii) a flipper connected to said extension by a living hinge and pivotable between a blocking orientation wherein said flipper blocks movement of the front flap between said open and closed orientations and an enabling orientation wherein said flipper enables movement of the front flap between said open and closed orientations.

18. The plastic component of claim 17 wherein said flipper defines a downwardly extending projection, and said extension defines a downwardly extending groove; in the closed and blocking orientations, said flipper projection extending through the front flap relatively small aperture and being snugly but releasably received by said extension groove, with both said flipper projection and said extension groove extending into the relatively small front face aperture and below the box front face.

19. The plastic component of claim 18 wherein said extension groove is undercut at the ends thereof for releasably securing said plastic component to said box front face without the use of glue.

20. The plastic component of claim 18 wherein, in said closed and blocking orientations, said flipper is connected to said extension only by said living hinge and the engagement between said flipper projection and said extension groove.

21. The plastic component of claim 18 wherein, in said closed and blocking orientations, said flipper engages only said extension of said plastic component.

* * * * *